Aug. 27, 1968  A. BETTIS  3,398,820
OPERATION OF DOG-CLUTCHES FOR CABLE LIFTERS
Filed July 6, 1966  5 Sheets-Sheet 3
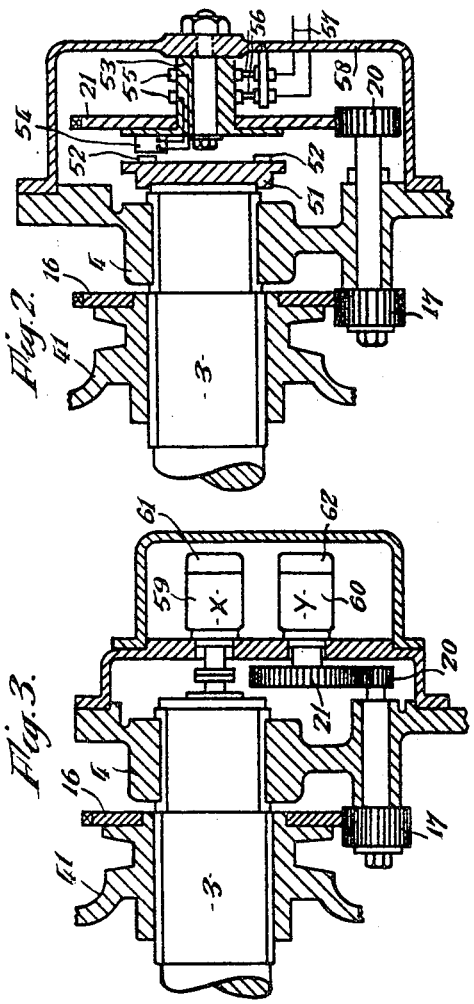
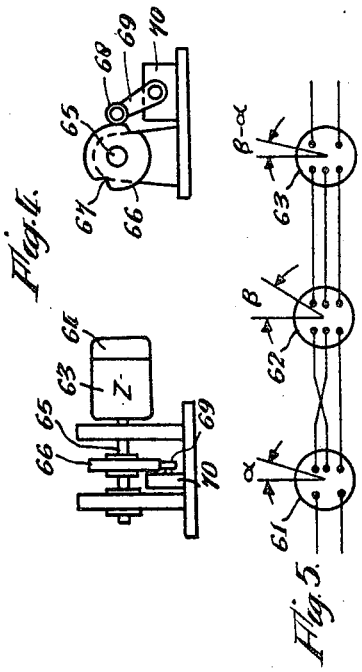
INVENTOR
ALFRED BETTIS

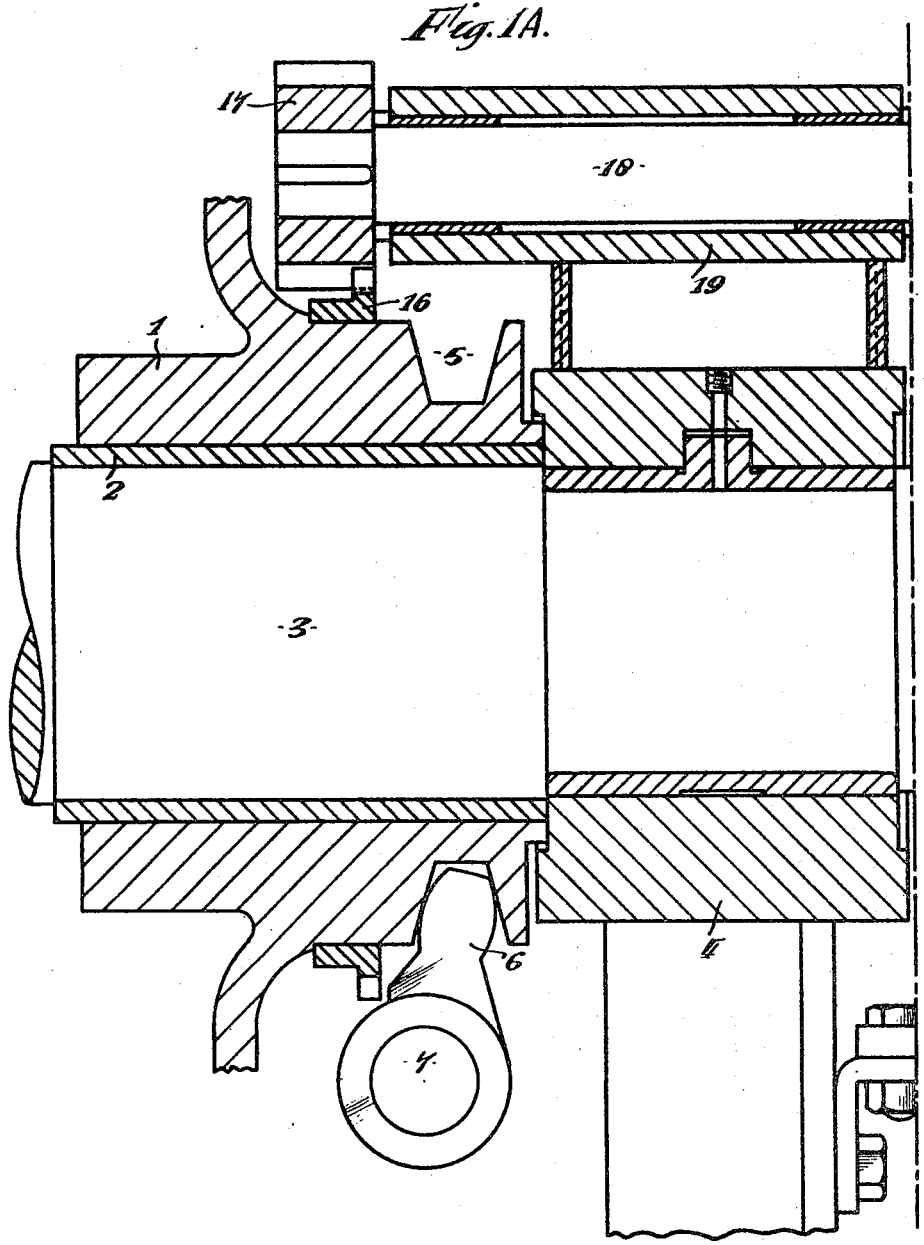

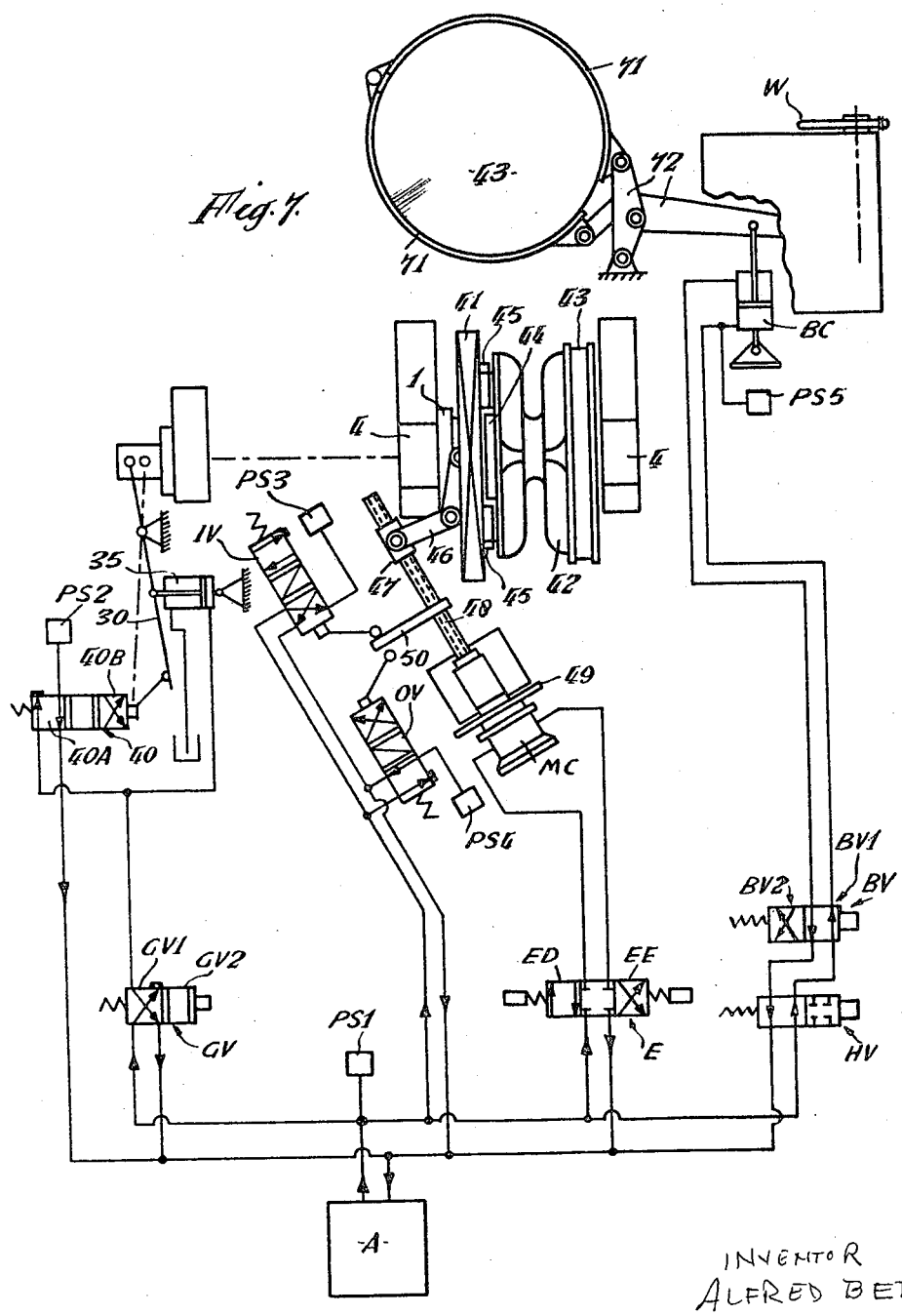

United States Patent Office 3,398,820
Patented Aug. 27, 1968

3,398,820
OPERATION OF DOG-CLUTCHES FOR CABLE LIFTERS
Alfred Bettis, Gateshead, England, assignor to Clarke, Chapman & Co. Limited, Gateshead, England, a company of Great Britain and Northern Ireland
Filed July 6, 1966, Ser. No. 563,245
11 Claims. (Cl. 192—35)

ABSTRACT OF THE DISCLOSURE

The invention facilitates the operation of dog-clutches employed for elements subjected to heavy loads, for example, dog-clutches used for ship's anchor windlasses. The control means of the invention include elements rotatable with driven and driving members respectively, responsive means rotatable with these elements and adapted to co-operate when the dog-clutch is in a position to engage; and a control device actuable by the co-operating responsive means to permit engagement of the dog-clutch.

---

This invention relates to the operation of dog-clutches of the kind employed for interconnecting and disengaging elements subjected to heavy loads, such that it is not feasible to engage or disengage a dog-clutch while the loaded element is rotating. The invention also relates to remote control systems for machinery including such dog-clutches.

For example, in a windlass for a ship's anchor chain cable, it is common practice to mount the chain sprocket, or as it is usually called, cable lifter, and a brake drum rotatable therewith, on a shaft with a driving gear wheel, either the cable lifter or the gear wheel being keyed to the shaft, and the other being rotatable thereon, and a dog-clutch being provided for connecting the gear wheel to the cable lifter when the latter is required to be driven. Since this occurs only when the anchor is to be hauled in, or occasionally lowered to the water line under power, the cable lifter is for the most part immobilized. It is therefore customary to provide the windlass with a winch drum and/or a warp-end drum and means whereby these may be selectively driven from the same engine or motor, the cable lifter driving wheel then rotating idly. Most commonly, the system is duplicated, with two cable lifters, two warp-end drums and optionally two winch drums assembled and arranged to be selectively driven by one engine or motor.

Hitherto it has also been common practice to provide, for effecting axial displacement of the driving gear wheel, a nut on the spindle, and a lever having one arm displaceable by the nut and another arm engaging in an annular groove in the hub of the gear wheel, so as to engage or disengage the dog-clutch of which co-operating dogs are provided on opposed faces of said gear wheel and cable lifter.

An object of the invention is to provide means for facilitating the engagement of a dog-clutch, particularly a dog-clutch for a cable lifter as aforesaid, under remote control. This may generally be an integer in a system for remotely controlling the full range of operations of a ship's windlass, or like apparatus capable of multiple operations.

The invention provides means for control of a dog-clutch comprising, in combination with coaxial driving and driven members respectively provided with co-operating elements of the dog-clutch and one of said members being axially displaceable, a first element rotatable with and at a fixed proportion of the speed of the driven member, a second element rotatable with and at the same proportion of the speed of the driving member, responsive means rotatable with said first and second elements and arranged to co-operate when the dog-clutch elements are aligned to be mutually engageable, and a control device actuable by said co-operating responsive means to permit axial movement of said displaceable member to engage the dog-clutch.

In means as aforesaid the first and second elements may be mounted coaxially with said members, the first element being secured to the driven member for rotation therewith, and gear means being provided to drive the second element at the same speed as the driving member. For example, said driven member may be secured upon a shaft, said first element secured to an end of the shaft, said driving member mounted with freedom for rotation and axial displacement on said shaft, with toothed gear rings on said driving member and said second element, a lay-shaft, and gear pinions secured to said lay-shaft, and in mesh with said gear rings to maintain equiangular rotation of said driving member and said second element.

In one embodiment of control means as last recited, said responsive means may comprise at least one permanent magnet mounted on and spaced from the center of said first element in fixed angular relationship with a dog-tooth on the driven member, a proximity switch mounted on said second element in the same fixed angular relationship with a dog tooth on the driving member and equally spaced from the centre of said second element to be actuable when aligned with said magnet, slip rings on said second element connected to the switch, and leads to the control device from brushes engaging said slip rings.

Alternatively in control means as first stated above said first and second elements may comprise driving components of two magslips, and the responsive means comprise transmitting components of said two magslips connected in circuit with a driving component of a third magslip to transmit thereto the difference of the angular displacements of said two transmitting components, a cam rotatable with a driven component of said third magslip, a cam-follower engaging said cam, a switch actuable by said follower, and leads from said switch to the control device.

In another embodiment of such control means, said first element may comprise a disc and at least one cam at the margin of the disc in fixed angular relationship with a dog tooth on said driven member, said second element comprising a cam follower in the same fixed angular relationship with a dog tooth on the driving member, means to maintain said cam follower in engagement with the margin of the disc, and means operable by engagement of said cam follower with the cam to actuate said control device.

Said control device in means as recited may be connected in the circuit of a remote control system so that when operated it serves, or causes actuation of another device which serves to stop the engine or motor whereby said driving member has been rotated at slow speed to bring the dog-clutch elements into engageable alignment. Operation of said control device may further serve to prepare the circuit of an auxiliary motor connected to clutch engaging gear, such as the screw and lever mechanism hereinbefore referred to, whereby the displaceable one of the driving and driven members is axially movable to engage the dog-clutch.

When the motive power is provided by an electric motor, said control device may be a switch connected to open the slow speed driving circuit of the motor, or to operate a relay or the like which serves to open said circuit, said switch also causing the closure of another switch to prepare the circuit of the auxiliary motor which is then energizable under remote manual control to effect engagement of the dog-clutch.

Alternatively, with an electric motor, or more particularly when the engine or motor is other than an electric motor, e.g. a steam engine or turbine, or a hydraulic motor, said control device may be a hydraulic valve connected to close the motive fluid supply valve, and to actuate another hydraulic valve which prepares the circuit of the auxiliary motor, which is a small hydraulic motor, so that this is put under the control of a remote manually actuable valve to be operable for effecting engagement of the dog-clutch.

Various embodiments of the invention will be described by way of example with reference to the accompanying diagrammatic drawings, wherein:

FIGS. 1A and 1B illustrate an application of the invention to a cable-lifter in a ship's windlass;

FIG. 2 is a similar, fragmentary axial section of an alternative embodiment;

FIG. 3 is a similar axial section of yet another embodiment;

FIG. 4 is an end view of a component of the same, and

FIG. 5 shows an electrical circuit therefor;

FIG. 7 is a hydraulic circuit diagram of an electrohydraulic control system.

Figure 1B:
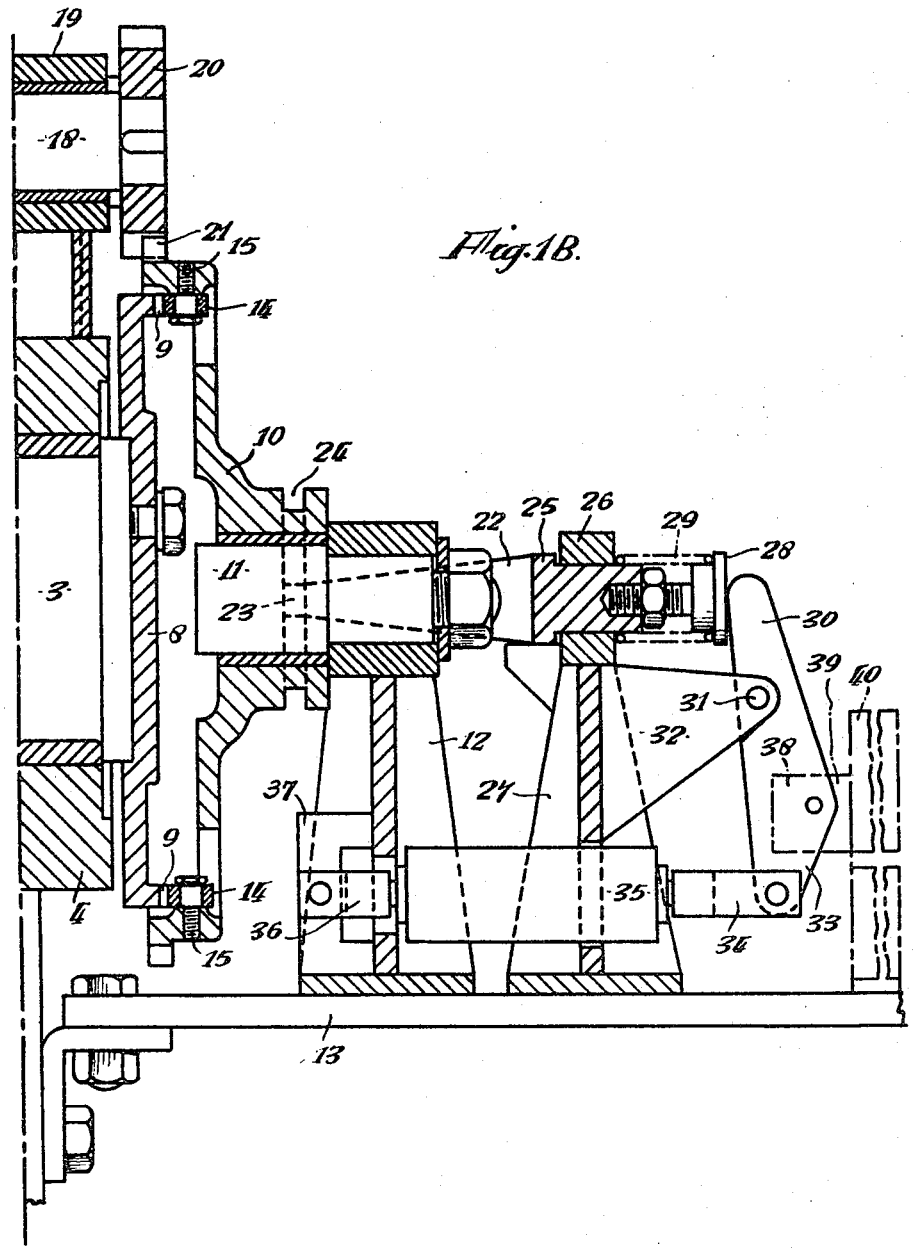

Referring to FIGS. 1A, 1B and 7, the hub 1 of a driving gear wheel 41 is rotatable and axially slidable on a brush 2 on a shaft 3. The shaft also carries a cable-lifter 42 and a brake drum 43 keyed thereto, which together with the driving gear wheel are located between a pair of pedestal bearings 4 for the shaft. Co-operating elements 44, 45 of a dog-clutch are provided on opposed faces of the cable-lifter and the gear wheel, and the hub 1 has an annular groove 5 in which is engaged a nose 6 constituting one arm of a bell crank lever pivoted on a fixed vertical spindle 7. The other arm of said lever is articulated to a nut 47, displaceable on a screwed spindle 48 provided with a hand wheel 49, as above described, whereby the dog-clutch is engageable or disengageable. The foregoing is known practice.

In connection with the invention, a small motor MC, which may according to the nature of the control system be an electric motor or a hydraulic motor, is also secured to the screwed spindle 48, and the bell crank lever is modified or the screwed spindle 48 is adapted by the provision thereon of a striker to actuate a mechanically operable hydraulic change-over valve means.

As shown in the drawing, FIG. 1B, there is secured to the journal end of shaft 3, so as to be rotatable positively with the cable-lifter 42, a disc 8 with a peripheral flange in which are formed two diametrically opposed arcuate cam recesses 9. Independently of the shaft 3, a rotary member 10 is coaxially mounted on a pin 11 secured in a pedestal 12 mounted on a bracket 13. The member 10 is freely rotatable and slidable on the pin 11, and carries two cam follower rollers 14, mounted on radial pins 15, which are diametrically opposed so that they are capable of simultaneously entering the cam recesses 9 when they come into register therewith. For driving the member 10 at the same speed as the driving gear wheel, the hub 1 has secured to it a gear ring 16 which is in mesh with a pinion 17 long enough to maintain the meshing throughout the sliding range of the gear wheel. The pinion 17 is keyed to one end of a lay-shaft 18 mounted in a sleeve 19 supported by the pedestal 4, and having keyed to its other end a pinion 20 in mesh with a ring of teeth 21 on the periphery of rotary member 10. The pinion 20 is long enough to maintain the meshing with teeth 21 when the member 10 is displaced axially, and the ratios of trains 16, 17 and 20, 21 are the same, so that the rotary member 10 is positively rotatable with and at the same speed as the driving gear wheel.

Means for maintaining the cam follower rollers 14 in engagement with the peripheral flange of disc 8, and causing the rollers to enter the cam recesses 9 when in register therewith, comprises a fork member 22, having on the ends of its prongs a pair of lugs 23 engaged in an annular groove 24 in the hub of member 10. The fork member 22 has a shank 25 slidable in a journal 26 supported by a pedestal 27 on the bracket 13, and carrying at its outer end an adjustable tappet head 28 between which end the side of journal 26 there is abutted a compression coil spring 29. The tappet head 28 is borne upon by an arm 30 of a lever pivoted on a pin 31 in a bracket 32 extending from the pedestal 27. The other arm 33 of the lever is articulated by a clevis 34 to the piston rod of a hydraulic actuator 35, whereof the cylinder is mounted by another clevis 36 upon a bracket element 37 secured to the pedestal 12. The arm 33 also carries a pin 38 to which is connected the operating member 39 of a hydraulic valve 40.

This arrangement is such that when hydraulic fluid under pressure has access to the cylinder of actuator 35, the lever arm 30 is caused to bear on the tappet head 28 against the force of spring 29 and through the fork 22 to urge the rotary member to the left so that the follower rollers 14 ride on the flange of disc 8 unless or until they register with recesses 9, which they are then caused to enter. Said recesses 9 are located in a fixed angular relationship to the clutch dogs on the cable-lifter, for example they may be on a diametrical plane through the axis of shaft 3, relative to which plane the dogs on the cable-lifter are symmetrical. Likewise the rollers 14 are located in the same angular relationship to the dogs on the driving gear wheel, so that the rollers 14 enter the recesses 9 only when the co-operating elements of the dog clutch are aligned to permit displacement of the driving wheel axially on shaft 3 to engage the clutch.

Entry of the rollers 14 into the recesses 9 allows the actuator 35 to push the lever arm 30 farther to the left with, of course corresponding movement to the right of arm 33, which operates the valve 40 to cause stopping of the main driving motor or engine of the windlass, which has been running at slow speed to effect idle rotation of the driving gear wheel. At the same time, when the control system is hydraulic, operation of valve 40 may actuate a guard valve (not shown) preceding a reversible control valve E (FIG. 7) for the auxiliary hydraulic motor MC, to apply fluid under pressure to said control valve whereby the auxiliary motor may be energized to rotate the screwed spindle and turn the nose 6 to displace the driving wheel and engage the clutch.

FIG. 2 shows an alternative embodiment of means responsive to the relative positions of the dogs on the cable lifter and driving wheel. Herein a disc 51 secured to the end of shaft 3 has mounted upon it a pair of diametrically opposed permanent magnets 52 in fixed relationship to the dogs on the cable lifter. The gear train 16, 17, 20, 21 drives a rotary member 53 having mounted on it a proximity switch 54, so that said switch is maintained in fixed relationship with the dogs on the driving wheel. The switch 54 is connected to slip rings 55 on the hub of member 53 which are engaged by brushes 56 connected to an external circuit by leads 57. Thus, the driving gear wheel 41 being slowly rotated, when the dogs come into relative positions at which the wheel 41 is displaceable to engage the clutch, the switch 54 is operated by one of the magnets 52, and transmits a signal by way of the leads 57 to an electrical control system which stops the main driving motor and may prepare a circuit for energization of the motor MC, which in this case is an electric motor with reduction gearing. The pedestal bearing 4 is modified to provide a mounting for a casing 58 to enclose the electromagnetic responsive means.

FIGS. 3–5 show another arrangement in which the responsive means comprises the well known magslips which are electrical devices for transmitting angular motion. As shown in FIG. 3, there is connected directly to the end of shaft 3 for rotation in unison therewith, the driving component 59 of a first magslip X. The driving component 60 of a second magslip Y is turned in unison with the teeth 21, by way of the gear train 16, 17, 20, 21. The transmitting components 61, 62 are connected in circuit with a driving component 63 of a third magslip Z, so as to transmit thereto as shown in FIG. 5 the difference of the angular displacements of the components 62, 63. The transmitting component 64 of the magslip Z is secured to a shaft 65 of a cam 66, which has two opposed recesses 67, either of which may be entered by a follower roller 68 mounted on an arm 69 arranged to operate a switch 70. When the dogs on the slowly rotated driving wheel 41 and the stationary cable lifter come into engageable relationship the switch 70 is operated and transmits a signal to an electrical control system which likewise stops the main driving motor and may prepare a circuit for energization of the clutch-engaging motor MC.

A hydraulic remote control system for a windlass driven by a steam engine or hydraulic motor, in which the means described with reference to FIGS. 1A and 1B are incorporated, may be such that, under control of a main valve whereby the system is made operable, fluid under pressure is supplied continuously (a) to the actuator 35, (b) to a port valve 40, (c) to a port in an inching control valve, and (d) to a port in one valve or each of two valves actuable by a projection on the bell crank lever 46 or an equivalent member 50 on the screw spindle 48. When said main control is in or restored to its cut-off state, all these supply lines are thereby connected to a return line for fluid to the supply reservoir.

(a) When the main control valve is cut off, spring 29 can urge the actutaor 35 to its contracted position, and at the same time withdraw the rotary member 10 from disc 9, so that the dog-clutch can be engaged or disengaged by manual operation of the screwed spindle.

There may also be provided in the hydraulic circuit of the auxiliary motor MC a manually operable by-pass or cut-off valve, so that manual engagement or disengagement of the dog-clutch is possible while the hydraulic control system otherwise remains effective, e.g. for the driving of winch and warp-end drums.

(b) and (c) To enable the engine or motor to rotate the driving gear wheel 41 at slow speed, conventional hydraulic control means may be provided to effect a small displacement of the motive fluid supply valve. When the valve 40 is operated as above described, it serves to close the supply valve to stop the engine or motor and immobilize the driving gear wheel at the position where the clutch can be engaged.

(d) When the clutch is engaged by operation of the auxiliary hydraulic motor MC, the projection on the arm of the bell crank lever 46 articulated to the nut on the screwed spindle or the equivalent member 50, as it moves towards the end of its stroke, may operate at least one hydraulic valve in said control means, thereby permitting the passage of fluid under supply pressure to hydraulic circuits of (i) a brake actuator and control valve, and (ii) actuator and control valve means to operate the supply valve for working the engine or motor in either direction.

Figure 6:
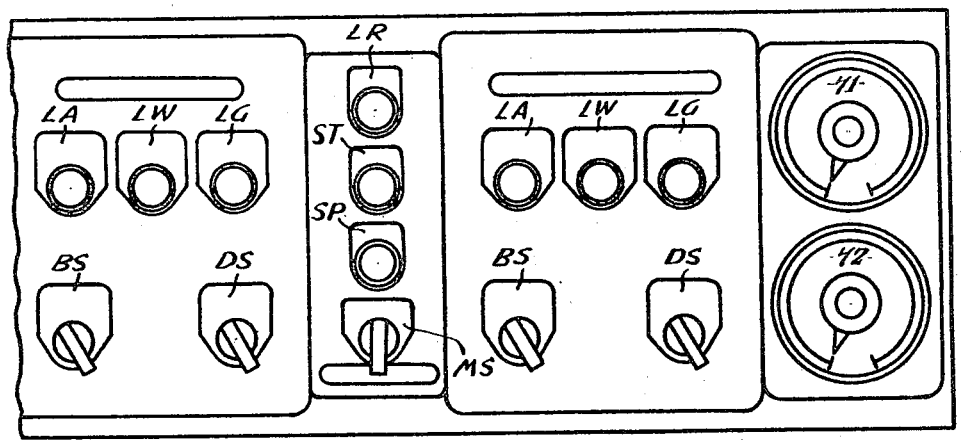
FIG. 6 shows a control panel.

An electro-hydraulic control system for a cable lifter in a windlass, driven by an electric motor provided with a built-in automatic brake will be described in further detail with reference to FIGS. 6, 7 and 8. FIG. 7 includes a diagrammatic side elevation of the brake drum 43 with friction bands 71 and operating lever-linkage means 72, connected to a hydraulic actuating cylinder BC, and provided with weights (not shown) to apply the brake and a screw operating gear with a hand wheel W whereby the brake may be released manually when the hydraulic system is de-pressurized.

Figure 8:
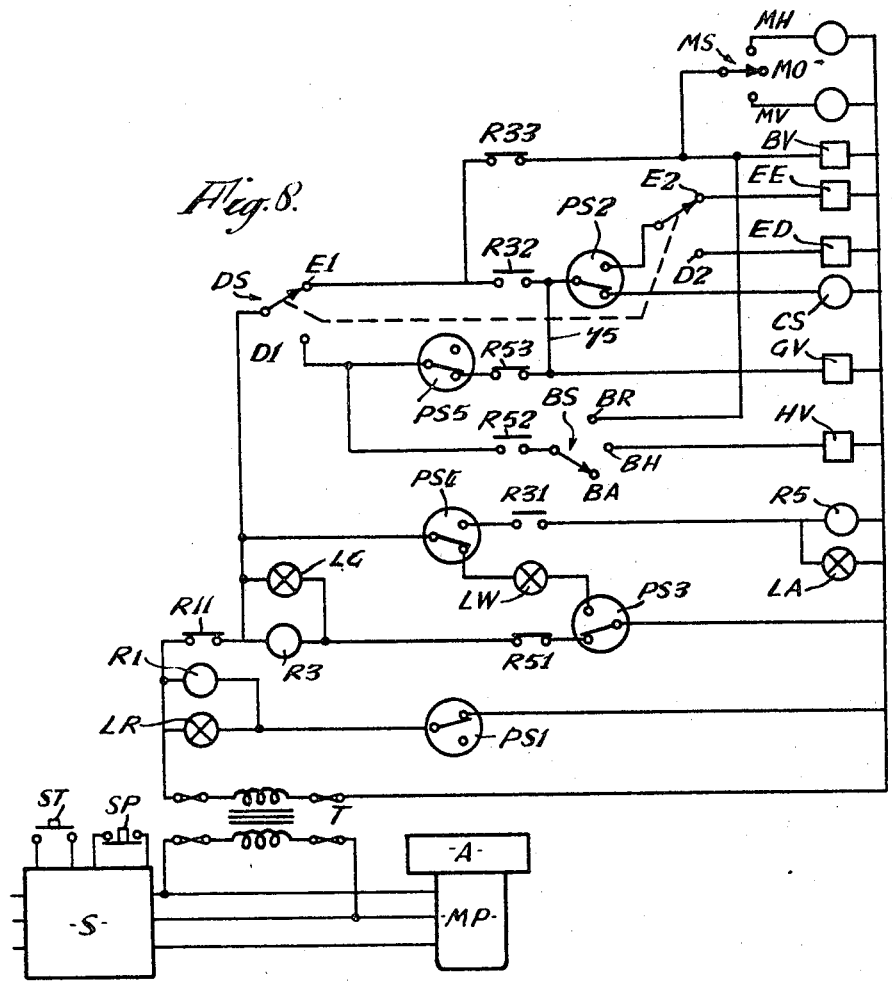
FIG. 8 is an electrical circuit diagram of the same.

In FIG. 7 the clutch dogs 44, 45 on the gear wheel 41 and cable lifter 42 are shown in the engaged position, and in both FIGS. 7 and 8 the several hydraulic valves, pressure operated switches and electro-magnetic relays are shown in the corresponding state. A remote control panel, as shown by way of example in FIG. 6, in addition to "start" and "stop" buttons ST, SP and a red "Power on" lamp LR, comprise three rotary control switches, (i) a switch DS for controlling engagement and disengagement of the dog-clutch, with duplicate "disengage" contacts D1, D2 and "engage" contacts E1, E2 (FIG. 8); this switch can be left in either the "disengage" or "engage" position; (ii) a brake switch BS, with three contacts BA "apply," BH "hold" and BR "release" (FIG. 8), this switch being spring returned to the "apply" position; and (iii) a switch MS controlling the windlass motor (not shown), also having three contacts MH for "heave" or "haul in," MV for "veer" or "pay out" and MO, "off" (FIG. 8) this switch being spring returned to the "off" position. Evidently, the control system may be duplicated for a windlass having two cable lifters selectively driven by a single motor, with a duplicated control panel as shown in FIG. 6, selection of the port or starboard cable lifter to be operated being effected by engagement of its driving clutch, while the clutch of the other is disengaged. Of course, both clutches may be disengaged and the cable lifters both automatically braked when the windlass includes winch drums and/or warp-end drums adapted to be selectively clutched with and driven by the windlass motor.

A control system for a single cable lifter, or each of duplicated systems for two cable lifters, also includes on the control panel a green lamp LG which when lighted indicates "clutch in," an amber lamp LA to indicate "clutch out," and a white lamp LW to indicate "clutch in intermediate position," that is, in process of being engaged or disengaged.

Throughout the following description of operations of this control system with references to FIGS. 7 and 8, the hydraulic circuit is assumed to be pressurized and the electrical circuit energized as follows:

The "start" button ST of starter S is operated to energize transformer T and motor MP of the hydraulic power pack A. Pressure switch PS1 is closed by the fluid pressure which energizes the relay R1 to close its contacts R11, and lights the red "Power on" lamp LR.

With the clutch in the engaged state (CLUTCH IN) the valves IV and OV are held mechanically as shown in FIG. 7 so that switch PS3 is pressurized, whereby relay $R^3$ is energized and the green light LG is lit. Relay R3 when energized (i) through its contacts R31 opens the circuit (also open at unpressurized switch PS4) of relay R5; (ii) through its contacts R32 opens the electromagnetic circuit of valve ED, EE controlling the auxiliary motor MC; and (iii) through its contacts R33 closes the circuit of the motor switch MS, and the electro-magnetic circuit of the brake valve BV whereby this valve in the position BV1 passes fluid to lift the brake actuator BC and release the brake bands 71 (the cable-lifter 42 now being held or released as required by the automatic brake of the driving motor) and to pressurize the switch PS5, which causes displacement of the guard valve GV to its position GV1 as shown, cutting off the pressure fluid from the valve 40.

In this state, the cable lifter 42 can be driven in either direction to haul in or pay out cable, at any required speed. The control panel may be provided as shown in FIG. 6, with indicators 71, 72 (duplicated as required) to indicate the length of cable paid out, and the rate of paying out of the cable. Owing to the necessary play or tolerance between the radial surfaces of the clutch dogs 44, 45, when the cable-lifter is driven in either direction the dogs are displaced from the strict position of alignment required by the cam grooves 9 and follower rollers 14 (FIG. 1B) and therefore the rollers 14 are lifted out of the grooves so that the valve 40 is "closed" as shown and switch PS2 is depressurized.

When it is required to disengage the clutch (i.e. to change to the CLUTCH OUT state) the switch DS is operated to move its contact arms to the contacts D1, D2, which breaks the main circuit of the motor switch MS and the electro-magnetically operated brake valve BV, causing the latter to assume the position BV2, operating the brake actuator BC to apply the brake bands 71, and depressurizing the switch PS5. The latter displaces the guard valve GV to its position GV2, so as to apply fluid to the control actuator 35 to prepare the means responsive to the position of the clutch dogs for operation of the valve 40 when the clutch dogs are brought into alignment (e.g. when there are two dogs on each of the driving and driven members; with their mean radii precisely at 90°). Through the now depressurized switch PS5, the adjacent relay contacts R53, a cross lead 75 and the depressurized switch PS2 a creep speed relay CS is energized. Since the cable lifter 42 is under load, by reason of play or spacing between the radial faces of the dog teeth 44, 45, these teeth are out of their position of alignment, and need to be restored to such position where they are unloaded, before the clutch can be disengaged. In this state the responsive means is also inoperative. The creep speed relay CS enables the windlass motor to be driven at slow speed in the veering direction to bring the dogs into their aligned and unloaded position, whereupon the responsive means operates to move the valve 40 to its position 40B and pressurize the switch PS2. The latter switch thus opens the circuit of creep speed relay CS and energizes the electromagnet of control valve E to move it to its position ED.

Thereby the motor MC is powered to rotate the spindle 48 to disengage the clutch. During this operation, the striker 50 first permits the valve IV to move to its closed position, depressurizing the switch PS3. This puts out the green lamp LG, lights the white lamp LW and de-energizes the relay R3, whereby the contacts R31, R32 and R33 revert to the positions opposite to those shown in FIG. 8. When the clutch is fully disengaged, the striker 50 opens the valve OV and thereby pressurizes the switch PS4, which puts out the white lamp LW and completes the circuit of the relay R5 and amber lamp LA. The energized relay R5 (i) through its contacts R51 further opens the circuit of relay R3 and lamp LG; (ii) through its contacts R52 closes the circuit of brake switch BS so that the brake may be released when required to permit the cable to run out under gravity while the clutch is disengaged; and (iii) through its contacts R53 opens the circuit, of the guard valve GV which is thus moved to the position GV1 to connect the control valve actuator 35 (FIGS. 1B and 7) to the fluid relief line, whereby the control valve 40 is closed and the switch PS2 is depressurized.

When it is required to re-engage the clutch (that is, to change to a CLUTCH IN state) the switch DS is moved to the "engage" position, so that its movable contacts are displaced from the fixed contacts D1, D2 to the contacts E1, E2. Hereby (i) the circuit of the creep speed relay CS is closed through the contacts R32 and switch PS2 to permit the windlass motor to be operated to drive the gear wheel 41 in the veering direction at slow speed; (ii) the circuit of the guard valve GV is energized through the contacts R32 and the lead 75 to move said valve GV to its position GV2; and (iii) the circuit of the valve ED, EE is prepared for operation when the switch PS2 is pressurized on operation of the responsive means.

The gear wheel 41 is then rotated slowly until the dogs 44, 45 of the clutch are in alignment for engagement, whereupon the responsive means acts as hereinbefore described with reference to FIGS. 1A and 1B, and moves the valve 40 to its open position. Thereby the switch PS2 is pressurized to break the circuit of relay CS and energize the electromagnetic circuit of the valve controlling the auxiliary motor MC so that this valve moves to the position EE and the motor MC rotates to engage the clutch. As this operation proceeds and the striker 50 follows the nut 47 along the screwed spindle 48, the mechanically operated valve OV is released and thereby moves to its closed position, depressurizing the switch PS4. This de-energizes the relay R5, puts out the amber lamp LA, and lights the white lamp LW. When the clutch is re-engaged, the valve IV is restored to its open position as shown, and switch PS3 is pressurized, to put out the white lamp LW, light the green lamp LG and re-energize the relay R3, thereby restoring the electrical circuit to its original state as shown.

The remote control system as described is adapted for fully controlling the operations of a windlass from a remote station, for example, on the bridge of a ship. The hydraulic controls, comprising the power pack A with its motor MP and the electromagnetically operated hydraulic valves (that is, excluding the mechanically operated valves 40, IV and OV) may be mounted in a suitable casing on the underside of the deck, beneath the windlass.

The cable-lifter brake is released by means of the actuator cylinder BC, and applied by weights assisted by said cylinder. The weights are themselves sufficient to apply the brake fully, so that the arrangement is "fail-to-safe" in the event of electrical or hydraulic failure.

Both the dog-clutch and the cable-lifter brake are provided with manual controls (respectively handwheel 49 and handwheel W) which together with a master electric controller located near the windlass enable the anchor cable to be hauled in or paid out from the locality of the windlass, or the windlass to be operated locally in the event of hydraulic failure.

What I claim and desire to secure by Letters Patent is:

1. Means for control of a dog-clutch comprising, in combination with co-axial driving and driven members respectively provided with co-operating elements of the dog-clutch and one of said members being axially displaceable, a prime mover connected to said driving member, a first element rotatable with and at a fixed proportion of the speed of the driven member, a second element rotatable with and at the same proportion of the speed of the driving member, responsive means rotatable with said first and second elements and arranged to co-operate when the dog-clutch elements are aligned to be mutually engageable, a control device actuable by said co-operating responsive means to permit axial movement of said displaceable member to engage the dog-clutch, a remote control system and means in said system to control the prime mover for rotation of said driving member at creep speed to bring the dog-clutch elements into engageable and unloaded disengageable alignment, and having said control device connected into said control system to stop the prime mover when the clutch elements are aligned.

2. Control means as claimed in claim 1, wherein said first and second elements are mounted co-axially with said members, the first element being secured to the driven member for rotation therewith, and further comprising gear means to drive the second element at the same speed as said driving member.

3. Control means as claimed in claim 2, further comprising a shaft, said driven member being secured to said shaft, said first element being secured to an end of said shaft, said driving member being mounted with freedom for rotation and axial displacement on said shaft, and toothed gear rings on said driving member and said second element, a lay-shaft, and gear pinions secured to said lay-shaft and in mesh with said gear rings to maintain equi-angular rotation of said driving member and said second element.

4. Control means as claimed in claim 2, wherein said responsive means comprise at least one permanent magnet mounted on and spaced from the center of said first element in fixed angular relationship with a dog tooth on the driven member, a proximity switch mounted on said second element in the same fixed angular relationship with a dog tooth on the driving member and equally spaced from the center of said second element to be actuable when aligned with said magnet, slip rings on said second element connected to the proximity switch, brushes engaging said slip rings, and leads to the control device from said brushes.

5. Control means as claimed in claim 2, wherein said first element comprises a disc and at least one cam at the margin of the disc in fixed angular relationship with a dog tooth on said driven member, and said second element comprises a cam follower in the same fixed angular relationship with a dog tooth on the driving member, and further comprising means operable to maintain said cam follower in engagement with said margin of the disc, and means operable by engagement of said cam follower with said cam to actuate said control device.

6. Control means as claimed in claim 5, wherein said means operable by engagement of the cam follower with the cam comprise a hydraulic actuator cylinder, a spring disposed to disengage the cam follower from said cam disc, lever means enabling said actuator cylinder when energized to urge the cam follower into engagement with the cam disc against the action of said spring, and a hydraulic valve connected wiht said lever means to be operable thereby upon engagement of said cam follower with the cam to actuate said control device.

7. Control means as claimed in claim 1, further comprising three magslips, said first and second elements being driving components of a first and a second of said magslips, and the responsive means being transmitting components of said first and second magslips connected in circuit with the driving component of the third of said magslips to transmit thereto the difference of the angular displacements of said two transmitting components, a cam rotatable with the driven component of said third magslip, a cam follower engaging said cam, a switch actuable by said follower, and leads from said switch to the control device.

8. Control means as claimed in claim 1, further comprising clutch engaging gear adapted to displace said driving member axially, a reversible auxiliary motor to operate said engaging gear, and means whereby said control device further serves to prepare the circuit of said auxiliary motor for operation in the required direction.

9. Control means as claimed in claim 8, in combination with an electric driving motor serving as said prime mover, a reduction geared electric auxiliary motor, and a remotely operable electrical control system therefor, the driving motor being adapted and controllable to rotate said driving member at creep speed to bring the dog-clutch elements into engageable and unloaded disengageable alignment, said control device when actuated serving to open a creep speed circuit of the driving motor and to close a switch to prepare the circuit of the auxiliary motor for energization under remote control to rotate in the required direction for operating the dog-clutch.

10. Control means as claimed in claim 8, in combination with a fluid powered engine adapted and controllable to rotate said driving member at creep speed to bring the dog clutch elements into engageable and unloaded disengageable alignment, a hydraulic auxiliary motor and a remotely operable electro-hydraulic control system, electrical switch means included in said system and operable by said control device when actuated to stop said engine and to prepare a circuit of said auxiliary motor for energization under remote control to rotate in the required direction for operating the dog-clutch.

11. Control means as claimed in claim 1, said machine further comprising a brake secured to the driven member, means adapted automatically to apply said brake, and a hydraulic actuator adapted when energized to release said brake, and said remote control system being an electrohydraulic system which includes a brake control switch arranged to operate said actuator and release the brake when the clutch is disengaged.

References Cited

UNITED STATES PATENTS 2,976,974   3/1961   Blyth _____ 192—67

FOREIGN PATENTS 27,819   12/1907   Great Britain.

BENJAMIN W. WYCHE III, *Primary Examiner.*

L. J. PAYNE, *Assistant Examiner.*